United States Patent [19]

Hall

[11] Patent Number: 5,420,683
[45] Date of Patent: May 30, 1995

[54] MULTIOSCILLATOR RING LASER GYRO BEAM COMBINING OPTICS

[75] Inventor: David B. Hall, La Crescenta, Calif.

[73] Assignee: Litton Systems, Inc., Woodland Hills, Calif.

[21] Appl. No.: 104,051

[22] Filed: Oct. 1, 1987

[51] Int. Cl.⁶ .................. G01C 19/64; G01B 9/02
[52] U.S. Cl. ..................... 356/350; 372/94
[58] Field of Search ............ 356/350, 351; 372/94; 350/403

[56] References Cited

U.S. PATENT DOCUMENTS

| | | | |
|---|---|---|---|
| 3,958,884 | 5/1976 | Smith | 356/351 |
| 4,025,194 | 5/1977 | Teppe | 356/5 |
| 4,084,883 | 4/1978 | Eastman et al. | 350/152 |
| 4,276,518 | 6/1981 | Ferguson | 331/94.5 |
| 4,289,381 | 9/1981 | Garvin et al. | 350/320 |
| 4,371,784 | 2/1983 | Rodgers | 350/396 |
| 4,408,334 | 10/1983 | Lundstrom | 372/98 |
| 4,410,277 | 10/1983 | Yamamoto et al. | 356/369 |
| 4,461,009 | 7/1984 | Lundstrom | 372/108 |
| 4,514,479 | 4/1985 | Ferrante | 430/2 |
| 4,536,063 | 8/1985 | Southwell | 350/395 |
| 4,588,296 | 5/1986 | Cahill | 350/96.5 |
| 4,643,575 | 2/1987 | Hazeltine et al. | 356/351 |
| 4,677,643 | 6/1987 | Vescial | 356/240 |
| 4,762,384 | 8/1988 | Hegarty et al. | 350/403 |

OTHER PUBLICATIONS

Hildum et al., "New Average-Power Damage . . . LLNL", Oct. 26, 1987, NTIS AN DE 88006231/XAB, 18 pp., abst. only.

*Primary Examiner*—Nelson Moskowitz
*Attorney, Agent, or Firm*—James F. Kirk

[57] ABSTRACT

Multioscillator beam-combining optics having prisms for processing both clockwise and anticlockwise elliptically polarized beams having both helicities transmitted through a partly transmissive corner mirror. The optical structure uses a thin-film polarizer with a waveplate which is not necessarily a quarter wave plate. Further, the waveplate thickness is determined so that one component of elliptically polarized light is converted into a linearly polarized beam. A thin film polarizer then blocks the linearly polarized beam. The waveplate principal crystal axes form a nominally forty five degree angle with the s and p polarization axes. Techniques are used to keep extraneous birefringence of the beams to a minimum.

12 Claims, 11 Drawing Sheets

MULTIOSCILLATOR RING LASER GYRO BEAM COMBINING OPTICS

BACKGROUND OF THE INVENTION

Ring laser gyros have a closed gas-laser path formed by three or more reflective corner mirrors. Two or more optical beams counterpropagate in the optical path. As the gyro is rotated about a sensing axis, the frequencies of the counterpropagating light beams vary. By sensing the variation of the light frequencies, a signal is produced that is a measure of the angular velocity to be measured. To sense the variation of the light frequencies, and more particularly to sense the differences between the light frequencies of two beams, it is necessary that an optical system be provided to extract a portion of the light from each beam.

Some ring lasers are multisensors which use multioscillators. That is, they have more than two beams, and the beam frequencies vary in a particular way in response to rotation about the sensing axis of the multioscillator.

A gyro multisensor which uses a differential four-mode ring laser gyro, herein called DILAG multioscillator, there are usually four beams, all elliptically polarized, including DILAGs, are described in, "Multioscillator Laser Gyros" by Weng Chow et. al, IEEE Journal of Quantum Electronics, QE16-9, September 1980, pages 918–936. It typically uses a four mode ring laser having two non-reciprocally biased ring laser beam pairs.

In a four-mode ring laser gyro for a DILAG multioscillator, four beams circulate within a ring laser, and the laser path is, typically, a non-planar closed loop having a sensing axis defined within the loop. The apparatus measures angular velocity, W, or displacement of the gyro about the sensing axis.

Usually, four corner mirrors define a non-planar closed path. Two oppositely elliptically polarized beams propagate in one direction, and two oppositely elliptically polarized beams propagate in the other direction around the closed loop. The individual beams are each very close to circularly polarized, and they are further recited herein as circularly polarized.

Two pairs of beams, each pair having a beam propagating in each direction around the laser path, are defined. Number the four beams 1, 2, 3, 4 and the corresponding frequencies of the four beams, from the lowest to the highest frequencies, $f_1$, $f_2$, $f_3$, $f_4$. Due to the configuring of the laser path into a non-planar path the pairs of beams having frequencies $f_1$, $f_2$ and $f_3$, $f_4$ are reciprocally biased upwards and downwards in frequency from gain center frequency, $f_o$.

In each pair of beams, the frequencies of the two beams are nonreciprocally biased upwards and downwards in frequency to separate the two frequencies in each pair. Beams 1 and 4 propagate in one direction through the ring laser path, and beams 2 and 3 propagate in the other direction along the ring laser path.

The frequencies $f_1$ and $f_2$ form a first gyro, and the frequencies $f_3$ and $f_4$ form a second gyro. The sensing axis of the DILAG multioscillator gyro is predefined within the laser path loop.

As the DILAG laser is rotated about its sensing axis in a first direction, the frequencies $f_1$ and $f_2$ move farther apart, and the frequencies $f_3$ and $f_4$ move closer together. When the angular velocity, W, of the laser about its sensing axis is reversed, the frequencies $f_1$ and $f_2$ move closer together, and $f_3$ and $f_4$ move farther apart. The angular velocity, W, is proportional to the frequency difference $f_{1,2}$ between the first and second frequencies $f_1$ and $f_2$, minus the frequency difference $f_{3,4}$ between the third and fourth frequencies, $f_3$ AND $f_4$.

Prior art optical systems for extracting light from the DILAG multioscillator use a quarter waveplate having a nominally zero degrees orientation with a polaroid sheet-polarizer. A polaroid sheet-polarizer has a 35% absorption loss. Polaroid sheet-polarizers warp with changes in temperature. Further, such polarizers are damaged by the high temperature processing required to manufacture a typical ring laser gyros in which they are imbedded.

In a typical DILAG multioscillator, two oppositely elliptically polarized beams propagate in a clockwise direction around the ring laser gyro path. Two other oppositely elliptically polarized beams propagate in a counter-clockwise direction around the ring laser gyro path. The laser path is, typically, defined by four corner mirrors forming a non-planar closed loop having a sensing axis defined within the loop. The apparatus measures angular velocity, W, or displacement of the gyro about the sensing axis.

The individual beams are almost completely circularly polarized, and they are herein further described as circularly polarized.

Two pairs of beams, each pair having a beam propagating in each direction around the laser path, are defined. Number the four beams 1, 2, 3, 4 and the corresponding frequencies of the four beams, from the lowest to the highest frequencies, $f_1$, $f_2$, $f_3$, $f_4$. Due to the configuring of the laser path into a non-planar path the pairs of beams having frequencies $f_1$, $f_2$ and $f_3$, $f_4$ are reciprocally biased upwards and downwards in frequency from gain center frequency, $f_o$.

In each pair of beams, the frequencies of the two beams are nonreciprocally biased upwards and downwards in frequency to separate the two frequencies in each pair. Beams 1 and 4 propagate in one direction around the ring laser path, and beams 2 and 3 propagate in the other direction around the ring laser path.

The frequencies $f_1$ and $f_2$ form a first gyro, and the frequencies $f_3$ and $f_4$ form a second gyro. The sensing axis of the DIIAG multioscillator gyro is predefined within the laser path loop.

As the DIIAG laser is rotated about its sensing axis in a first direction, the frequencies $f_1$ and $f_2$ move farther apart, and the frequencies $f_3$ and $f_4$ move closer together. When the angular velocity, W, of the laser about its sensing axis is reversed, the frequencies $f_1$ and $f_2$ move closer together, and $f_3$ and $f_4$ move farther apart. The angular velocity, W, is proportional to the frequency difference $f_{1,2}$ between the first and second frequencies $f_1$ and $f_2$, minus the frequency difference $f_{3,4}$ between the third and fourth frequencies, $f_3$ AND $f_4$.

Combining optics are needed to extract a portion, usually about 0.01% of the beam, from the ring laser. The four beams, upon exiting the multioscillator gyro, traverse two separate pathways through the combining optics, including at least one prism, to impinge on a first detector, and they traverse another two separate pathways to impinge upon a second detector.

In the prior art, at the output of the combining optics is one common quarterwaveplate and two suitably oriented polarizers in front of each of the detectors to receive the beat signals from the left and right circularly polarized gyros. In an ideal situation wherein all the phase shifts experienced by all the beams within the combining optics for both s and p polarizations are equal, the crosstalk approaches zero. When the various phase shifts are not all equal, the minimum crosstalk is a strong function of the deviation of the phase shifts from some common value.

The s component of polarization is defined perpendicular to the p component of polarization. For discussion, the p direction shall be considered to be parallel to the paper, and the s direction shall be considered normal to the paper.

The helicity of polarization, for each mode, alternates going from leg to leg of the ring laser. Because of the alternating of helicity direction, the designation "right handed" and "left handed" must be taken relative to a particular leg of the gyro.

It is determined that modes L1 and R4 enter the combining optics from the clockwise, or "C" direction, and modes R2 and L3 enter the combining prism from the anticlockwise, or "A" direction.

The L1, R2, L3, R4 received beams are changed to L1, L2, R3, R4 beams, whereby the L1 and L2 beams form a first gyro and the R3 and R4 beams form a second gyro. The reversal of ellipticity of beams R2 and L3 to L2 AND R3 is achieved by causing those beams to undergo an odd number of reflections while the L1 and R4 beams undergo an even number of reflections within the combining optics. If the total birefringence effects, up to the interface with a quarter waveplate, are kept to a minimum, the sequence L1, L2, R3, R4 beams are delivered to the quarter waveplate. The p-to-s amplitude ratios of the elliptically polarized beams within the laser are substantially one-to-one. At any point within the combining optics, it increase substantially, for example ten to one, because of the preferential transmission of p polarized light at the laser corner mirror. The quarter waveplate produces linearly polarized light beams along two non-orthogonal directions. In the ideal situation, the beat frequency component between beams 1 and 2 can be totally extinguished, by an ideal polarizer, with a transmission axis suitably placed, at one detector, and the beat frequency component between beams 3 and 4 can be totally extinguished, by an ideal polarizer, with a transmission axis suitably placed, at the second detector.

The prior art devices used polaroid sheet-polarizers in their apparatus which proved inefficient and difficult, if not impossible, in the heat environment needed to process commercial grade ring lasers.

BRIEF DESCRIPTION OF THE INVENTION

The apparatus of this invention does not use a sheet polarizer, but a thin-film polarizer with a waveplate. The waveplate is not necessarily a quarter waveplate. A thin-film polarizer is not only more efficient than a sheet polarizer, but its efficiency can accurately be predicted.

Consider an elliptically polarized wave having s and p polarization axes. Typically, the major axis of the ellipse is in the p direction. The electric field vectors, $E_L$ AND $E_R$ may be expressed in s, p coordinates as $$E_L \sim \begin{bmatrix} S \\ iP \end{bmatrix} \text{ and } E_R \sim \begin{bmatrix} S \\ -iP \end{bmatrix} \quad \text{equations (1) and (2)}$$

The principal axes of the waveplate, x,y, are at an angle of forty five degrees from the s,p axes. The $E_L$ and $E_R$ field vectors, ignoring constant coefficients, can be expressed in the x,y coordinates as follows $$E_L \sim \begin{bmatrix} S - iP \\ S + iP \end{bmatrix} \text{ and } E_R \sim \begin{bmatrix} S + iP \\ S - iP \end{bmatrix} \quad \text{equations (3) and (4)}$$

Factoring out and ignoring constant coefficients, $$E_L \sim \begin{bmatrix} e^{-i\phi} \\ e^{i\phi} \end{bmatrix} \text{ and } E_R \sim \begin{bmatrix} e^{i\phi} \\ e^{-i\phi} \end{bmatrix} \quad \text{equations (5) and (6)}$$

where $\phi = $ arctan P/S.

The waveplate shifts the phase of the x component, relative to the y component, of $E_L$ and $E_R$, by an amount $2\phi$, so the x and y components of the vector $E_L$ are made equal, in amplitude and phase, thus:

$$E_L \sim \begin{bmatrix} e^{i\phi} \\ e^{i\phi} \end{bmatrix} \sim \begin{bmatrix} 1 \\ 1 \end{bmatrix} \text{ and } E_R \sim \begin{bmatrix} e^{i3\phi} \\ e^{-i\phi} \end{bmatrix} \sim \begin{bmatrix} e^{i2\phi} \\ e^{-i2\phi} \end{bmatrix} \quad \text{equations (7) and (8)}$$

These equations may then be expressed in the original polarizer s,p coordinate system.

$$E_L \sim \begin{bmatrix} 1 \\ 0 \end{bmatrix} \text{ and } E_R \sim \begin{bmatrix} e^{i2\phi} + e^{-i2\phi} \\ -e^{i2\phi} + e^{-i2\phi} \end{bmatrix} \sim \begin{bmatrix} \cos 2\phi \\ -i\sin 2\phi \end{bmatrix} \quad \text{equations (9) and (10)}$$

Thus, comparing the relative output intensities of the beams, the modes $L_1$, $L_2$ have a normalized intensity of 1 in the s direction, and an intensity of zero in the p direction. That is, the L modes are linearly polarized, and they are then eliminated by a thin film polarizer.

The R modes have intensities proportional to $I_S \sim \cos^2 2\phi$, and $I_p \sim \sin^2 2\phi$. Thus, the waveplate and the thin film polarizer which transmits only P, (tilted at an angle near the Brewster angle relative to the beams) blocks the L beams and passes part of the R beams.

In a similar fashion, at another corner mirror of the ring laser, the R beams are blocked, and a part of the L beams are passed.

Techniques are used to keep extraneous birefringence of the beams to a minimum.

It is therefore an object and a feature of this invention to extract individual beams from a multioscillator ring laser gyro to produce a signal that is a measure of angular velocity of the ring laser about its sensing axis.

It is another object and feature of the invention to use prisms, waveplates, and thin-film polarizers in the combining optical system of a multioscillator ring laser gyro, whereby information is more easily and precisely extracted.

Other objects will become apparent from the following description, taken together with the accompanying claims.

DETAILED DESCRIPTION OF THE INVENTION

Figure 1:
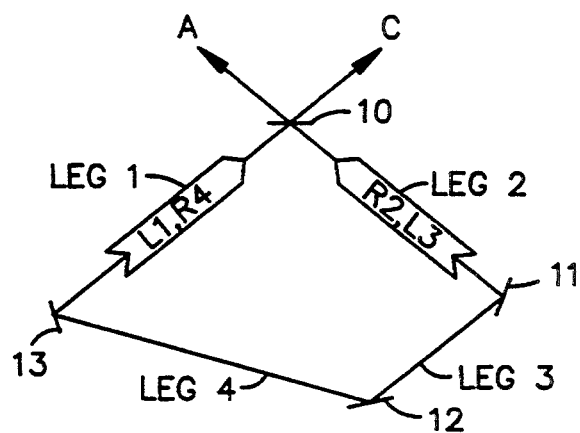
FIG. 1 is a beam diagram of a typical ring laser used in a gyro.

A typical ring laser gyro beam diagram is shown in FIG. 1. The figure is generalized in that the lengths of the legs are shown unequal.

In a two-beam ring laser gyro, the ring laser can have three or more legs, and the laser path may be either planar or non-planar.

However, in a multioscillator ring laser gyro there must be an even number of legs, and the laser path must be non-planar. The reasons for those constraints and the means for creating the laser beams are not germane to the invention. They are found in the references, and they need not be discussed.

The laser beams are reflected around a closed loop by the mirrors 10, 11, 12, 13, and a portion, perhaps 0.01% of each beam, is transmitted (99.99% reflected) by the mirror 10.

Figure 2:
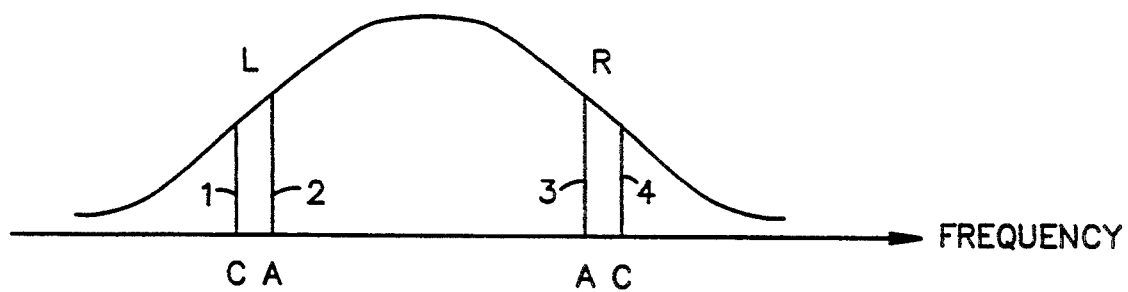
FIG. 2 is a representative graph of gain of a ring laser, plotted against frequency, showing the frequencies of the four beams of a multioscillator ring laser gyro.

FIG. 2 is a gain vs. frequency curve for a ring laser. Typically the ring laser is a gaseous laser, and the gain curve has a frequency spread. As shown, the lowest frequency, labeled "1", pertains to a first laser beam having a left handed helicity and a clockwise direction of propagation. Similarly, the next higher frequency, labeled "2", pertains to a second laser beam having a left handed helicity and an anticlockwise direction of propagation. The third frequency, labeled "3", pertains to a third laser beam having a right handed helicity and an anticlockwise direction of propagation. The highest frequency, labeled "4", has a right handed helicity and a clockwise direction of propagation.

Figure 3:
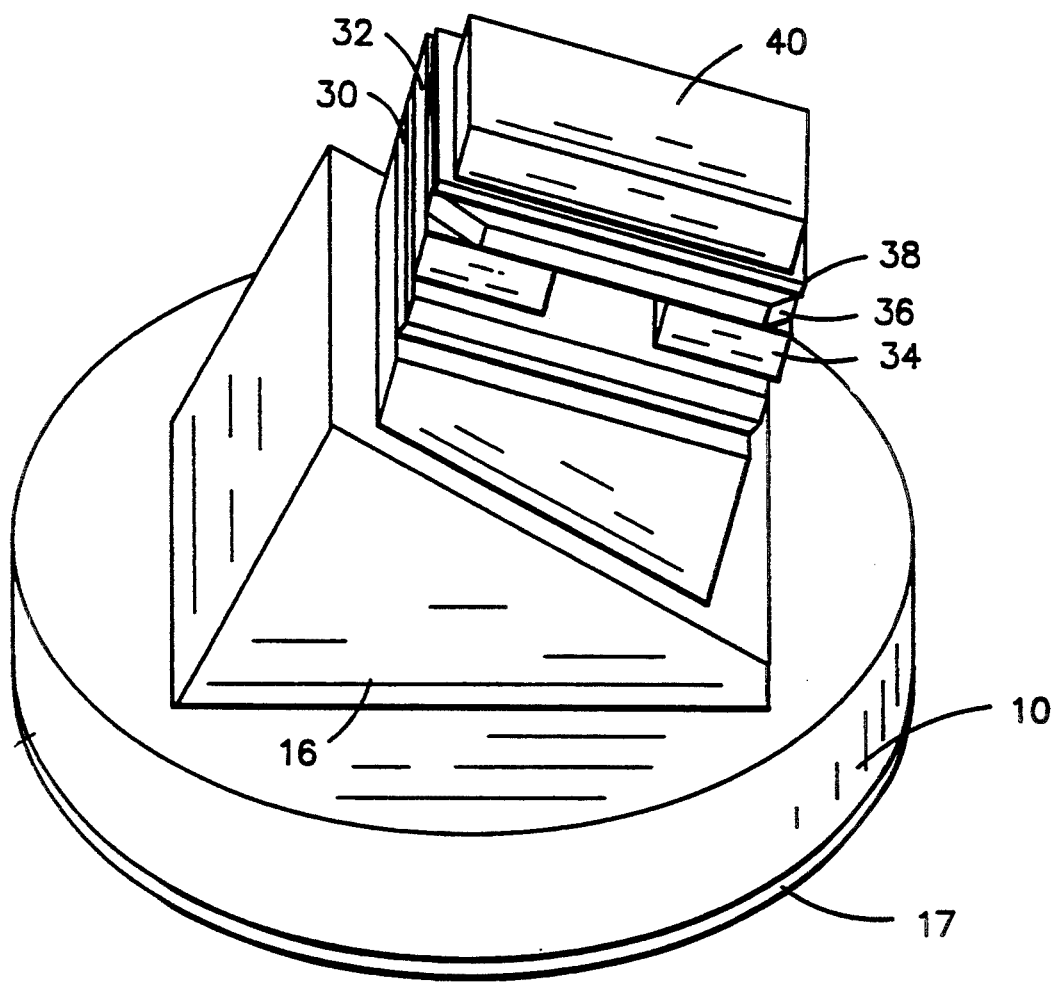
FIG. 3 is a view of a prior art multioscillator combining optics.
Figure 4:
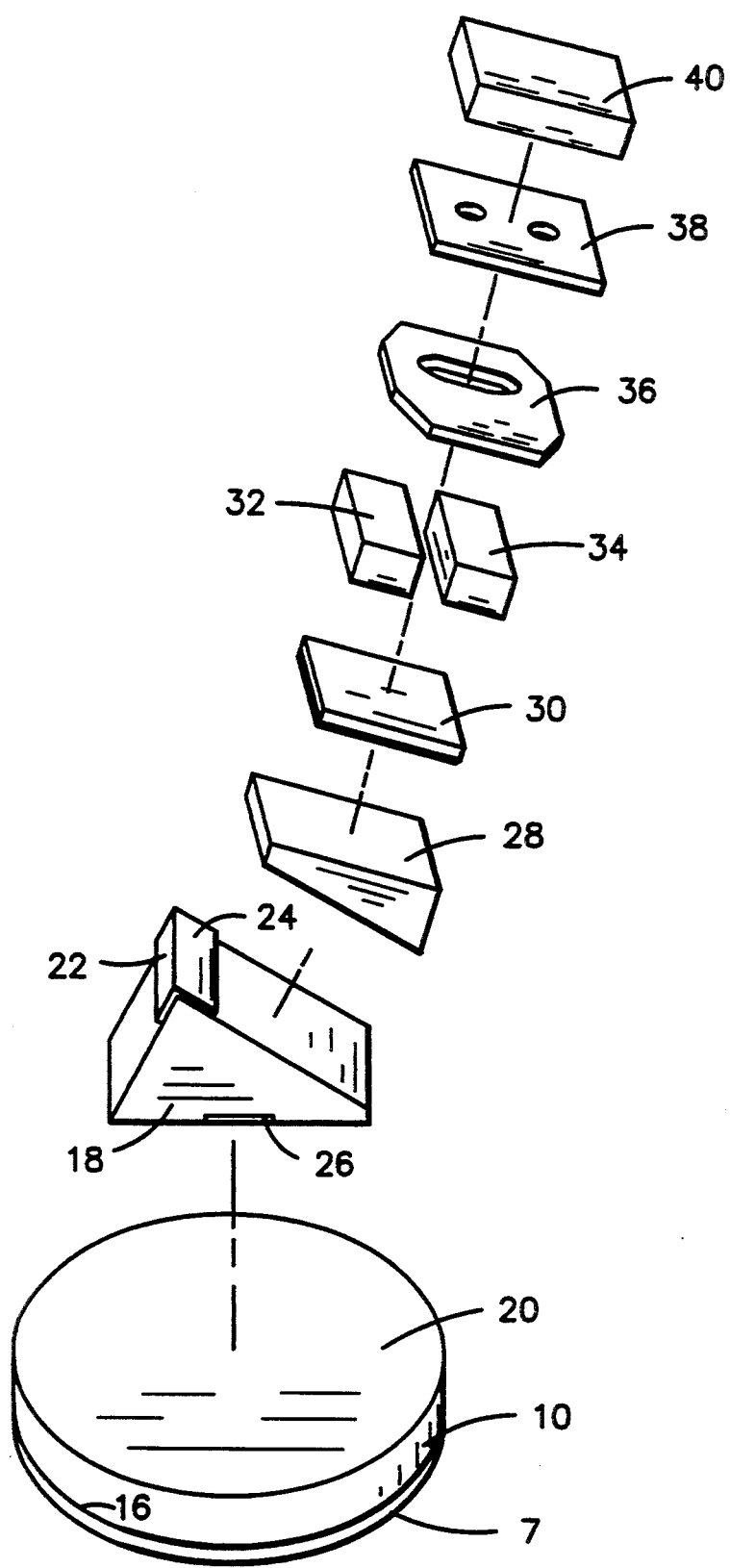
FIG. 4 is an exploded view of the prior art apparatus of FIG. 3.

FIGS. 3 and 4 show prior art combining optics. The mirror 10 has a frequency selective coating 17 on its inner surface 16.

A prism, 18 for receiving laser beams, contacts the outer surface 20 of the mirror 10. Mirror surfaces 22, 24 are positioned on the outer surface of the prism 18. A beam splitting mirror surface 26 is positioned upon the surface of prism 18 in contact with the mirror surface 20. The beam splitter 26 preferably reflects 50% of the received beam illumination and transmits 50% of the beam. The actual percentage of transmission and reflection varies, for it is sensitive to the polarization direction of the beam. A waveplate 30 receives the beams from the prism 18, and an optical wedge 28 is positioned between the prism 18 and the waveplate 30. The shape of the wedge 28 is angled to cause the beams exiting from the filter to be normal to the inside surface of the waveplate 30.

Sheet polarizers 32, 34 of polaroid material, are positioned to receive the light beam from the waveplate.

The light beams are then directed to the photosensor detectors (not shown) in housing 40.

The detector plate 36 acts as a spacer and support for the detectors. The detector mask 38 prevents extraneous light from entering the detectors.

The wedge 28 is designed to receive light beams from prism 18, without deviation, and to deliver such beams to the waveplate 30 normal to its surface.

Figure 5:
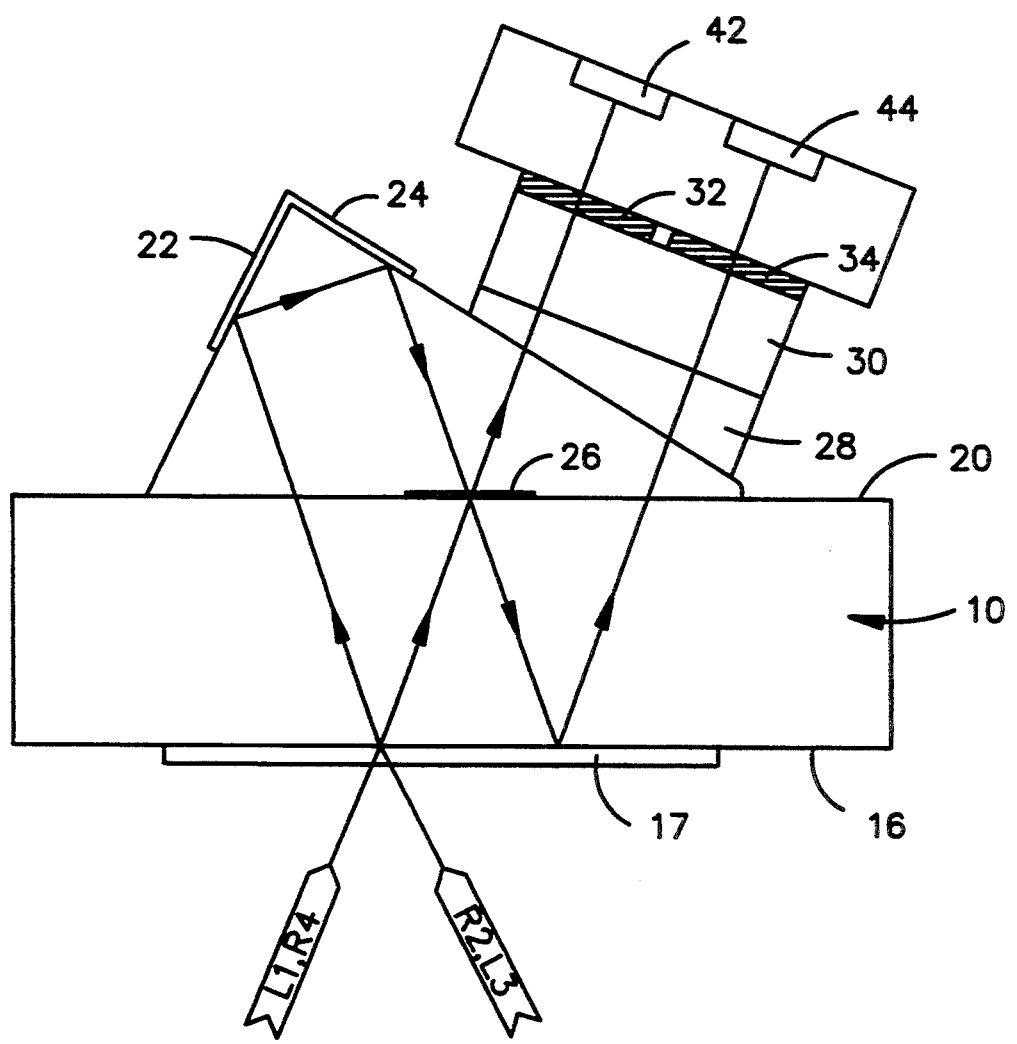
FIG. 5 is a beam diagram of the apparatus of FIGS. 3 and 4.

Operation of the apparatus can be understood by referring to FIG. 5.

Beams L1 and R4 are delivered through the mirror surface 17 to the beam splitting mirror 26 which transmits a portion, preferably 50% of the beam illumination, through the quarter waveplate 30 and the sheet polarizer 32 to the optical detector 42 within the detector housing 40. The illumination reflected from the beam splitter 26 is reflected onto the surface 17 (which has a 99.99% reflectance) which reflects such illumination through the quarter waveplate 30 and the sheet polarizer 34 to the optical detector 44.

Beams R2 and L3 are delivered through the mirror surface 17 to the corner mirrors 22 and 24 which, after a double reflection, deliver the beam to the beam splitting mirror 26. A portion, preferably 50%, of the beam illumination is reflected through the quarter waveplate 30 and the sheet polarizer 32 to the optical detector 42 within the detector housing 40. The illumination transmitted by the beam splitter 26 is reflected by the surface 17, (which has a 99.99% reflectance) through the quarter waveplate 30 and the sheet polarizer 34 to the optical detector 44.

The helicities of the beams R2, L3 are reversed to L2, R3 by the odd number of reflections. Thus, at the entrance to the quarter wave plate 30, the beams, in ascending frequency, are L1, L2, R3, R4. The frequencies L1 and L2 are of the same direction of helicity, and they form a first gyro. The frequencies R3 and R4 are of the same direction of helicity, and they form a second gyro. When the multioscillator ring laser gyro is rotated about its sensing axis in a first direction, the frequency difference L1–L2 increases, and the frequency difference R3–R4 decreases. When the sense of the rotation is reversed, the frequency difference L1–L2 decreases, and the frequency difference R3–R4 increases.

Figure 6:
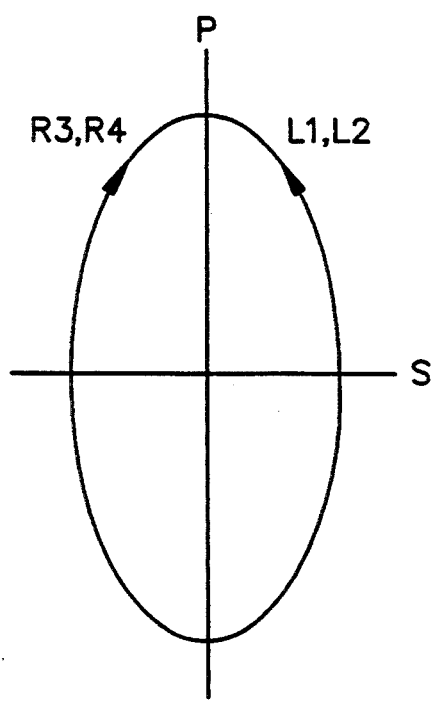
FIG. 6 is a diagram, on the p-s axes, of an elliptically polarized beam.
Figure 7:
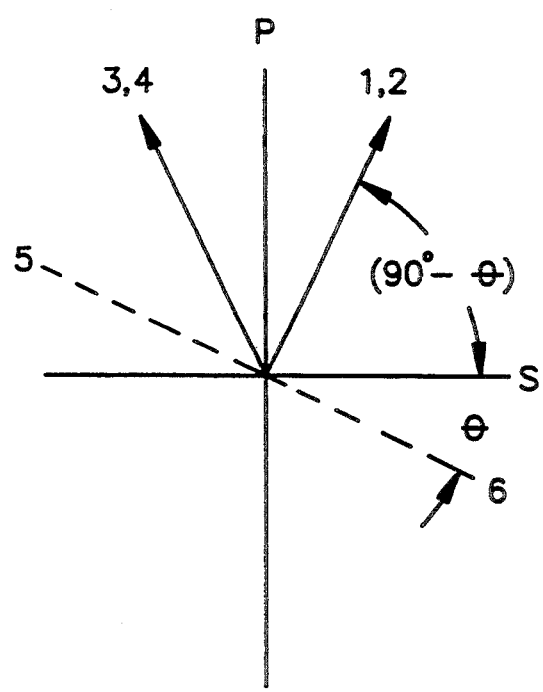
FIG. 7 is a diagram, on p-s axes, of the linear polarization at the output of the thin-film polarizer in the apparatus of the invention.

The quarter waveplate 30 converts the highly elliptically polarized light beams shown in FIG. 6 into linearly polarized light beams in two directions as shown in FIG. 7. The L polarized light is polarized into linearly polarized light in a first direction, and the R polarized light is polarized into linearly polarized light in a second direction.

The polarizer 32 is oriented to transmit only the light polarized in the first direction to the detector 42. The polarizer 34 is oriented to transmit only the light polarized in the second direction to the detector 44.

The angular velocity, then, is measured by the frequency differences $(f_1-f_2)-(f_3-f_4)$.

Figure 8:
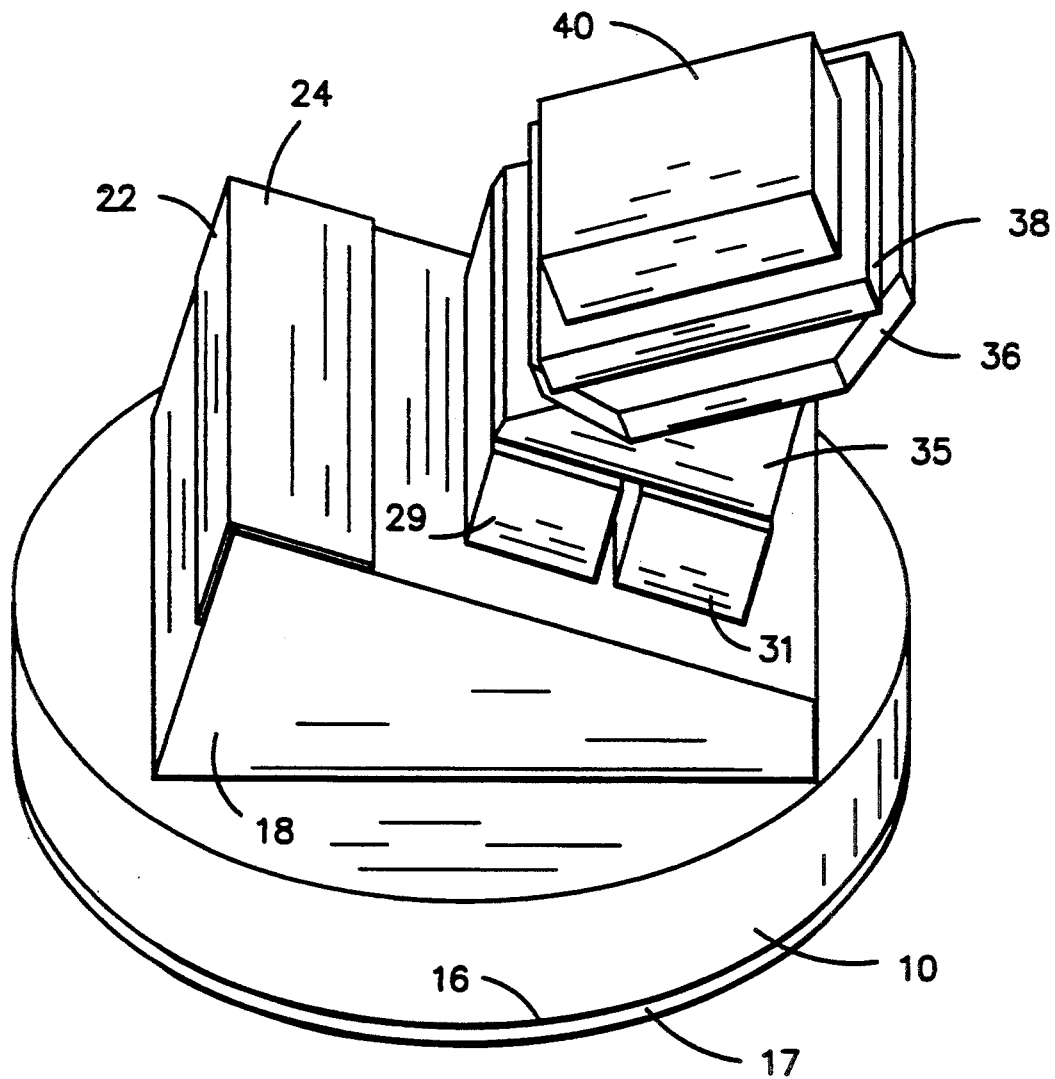
FIG. 8 is a view of a first embodiment of the invention.
Figure 9:
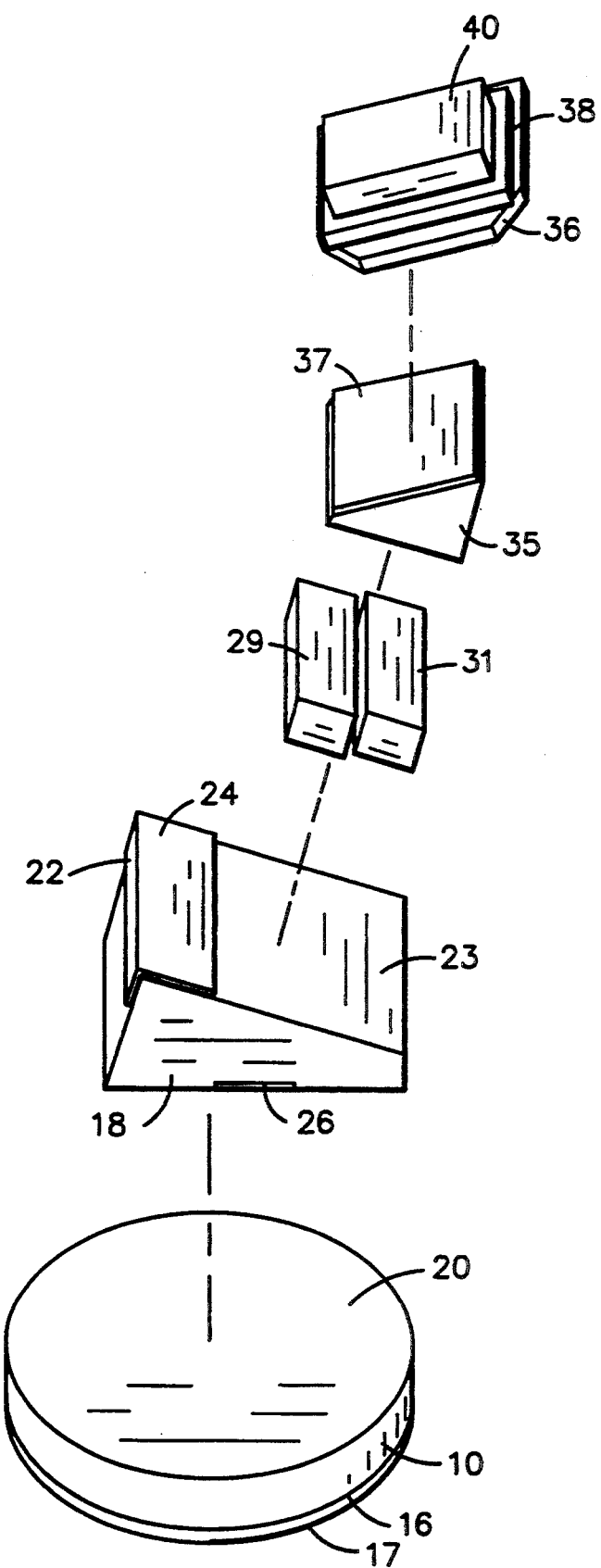
FIG. 9 is an exploded view of the apparatus of FIG. 8.

A first embodiment of the invention is shown in FIGS. 8 and 9. As in the prior art embodiment of FIGS. 4–7, a prism 18 is attached to the outer surface 20 of the ring laser mirror substrate 10. The prism is substantially identical to that shown in FIGS. 4–7. Two waveplates 29 and 31 are attached to the surface 23 of the prism 18 to receive beams of light from the prism 18. A prism 35 is attached to the outer surface of the waveplates. The prism 35 has a thin-film polarizer 37 attached thereto. The detector housing 40 is attached by the detector plate 36 to the waveplates 29 and 31. Each of the wave plates 29 and 31 are oriented at a nominally forty five degrees angle relative to the incoming beam polarizations, whereby it conducts and converts light beams from both elliptical polarization senses, with 70.7% amplitude conduction. The thin-film polarizer 37 is a precise and efficient polarizer, whereby it absolutely conducts light having a polarization component parallel to its conductive direction, and it precisely bars incoming polarized components that have only a component perpendicular to a particular axis.

Typically, the major axis of the ellipse is in the p direction. The electric field vectors, $E_L$ AND $E_R$ may be expressed in s, p coordinates as $$E_L \sim \begin{bmatrix} S \\ iP \end{bmatrix} \text{ and } E_R \sim \begin{bmatrix} S \\ -iP \end{bmatrix} \quad \text{equations (1) and (2)}$$

The principal axes of the waveplate, x,y, are at an angle of forty five degrees from the polarizer s,p axes. The $E_L$ and $E_R$ field vectors, ignoring constant coefficients, can be expressed in the x,y coordinates as follows $$E_L \sim \begin{bmatrix} S - iP \\ S + iP \end{bmatrix} \text{ and } E_R \sim \begin{bmatrix} S + iP \\ S - iP \end{bmatrix} \quad \text{equations (3) and (4)}$$

Factoring out and ignoring constant coefficients, $$E_L \sim \begin{bmatrix} e^{-i\phi} \\ e^{i\phi} \end{bmatrix} \text{ and } E_R \sim \begin{bmatrix} e^{i\phi} \\ e^{-i\phi} \end{bmatrix} \quad \text{equations (5) and (6)}$$

here $\phi = \arctan P/S$.

The waveplate shifts the phase of the x component, relative to the y component, of $E_L$ and $E_R$, by an amount $2\phi$, so the x and y components of the vector $E_L$ are made equal, in amplitude and phase, thus:

$$E_L \sim \begin{bmatrix} e^{i\phi} \\ e^{i\phi} \end{bmatrix} \sim \begin{bmatrix} 1 \\ 1 \end{bmatrix} \text{ and } E_R \sim \begin{bmatrix} e^{i3\phi} \\ e^{-i\phi} \end{bmatrix} \sim \begin{bmatrix} e^{i2\phi} \\ e^{-i2\phi} \end{bmatrix} \quad \text{equations (7) and (8)}$$

These equations may then be expressed in the original polarizer s,p coordinates system.

$$E_L \sim \begin{bmatrix} 1 \\ 0 \end{bmatrix} \text{ and } E_R \sim \begin{bmatrix} e^{i2\phi} + e^{-i2\phi} \\ -e^{i2\phi} + e^{-i2\phi} \end{bmatrix} \sim \begin{bmatrix} \cos 2\phi \\ -i\sin 2\phi \end{bmatrix} \quad \text{equations (9) and (10)}$$

Thus, comparing the relative output intensities of the beams, the modes $L_1$, $L_2$ have a normalized intensity of 1 in the s direction, and an intensity of zero in the p direction. That is, the L modes are linearly polarized, and they are then eliminated by a thin film polarizer which transmits only P.

The R modes have intensities proportional to $I_S \sim \cos^2 2\phi$, and $I_p \sim \sin^2 2\phi$. Thus, the thin film stack of the waveplate and the thin fill polarizer blocks the L beams and passes part of the R beams.

In a similar fashion, at another corner mirror of the ring laser, the R beams are blocked, and a part of the R beams are passed.

Figure 10:
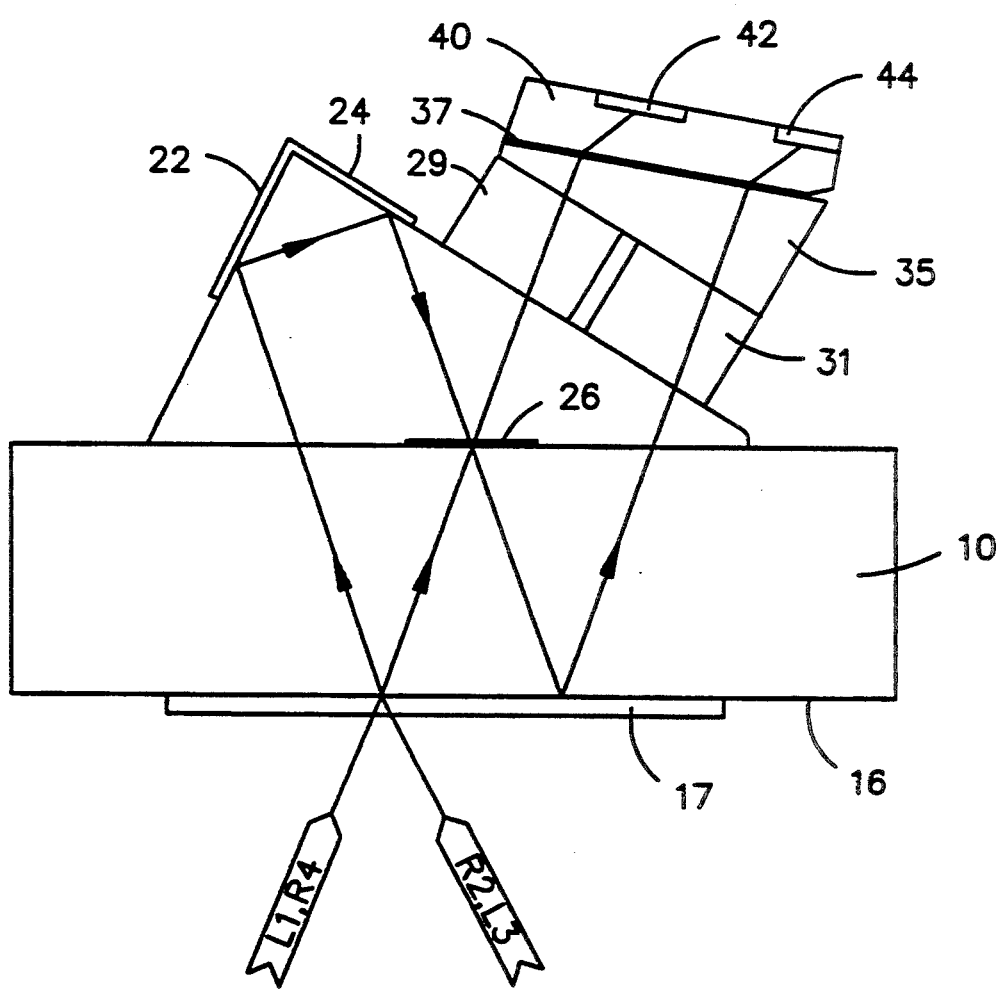
FIG. 10 is a ray diagram of the apparatus of FIGS. 8 and 9.

The operation of the apparatus of FIGS. 8–9 is described in connection with the ray diagram of FIG. 10.

Beams L1 and R4 are delivered through the mirror surface 17 to the beam splitting mirror 26 which transmits a portion, preferably 50% of the beam illumination, through the waveplate 29, the prism 35, and the thin-film polarizer 37 to the optical detector 42 within the detector housing 40. The beam splitter 26 reflects the remainder of the illumination onto the surface 17 (which has a 99.99% reflectance) which further reflects such illumination through the wave plate 31, the prism 35 and the thin-film polarizer 37 to the optical detector 44.

Beams R2 and L3 are delivered through the mirror surface 17 to the corner mirrors 22 and 24 which, after a double reflection, deliver the beam to the beam splitting mirror 26. A portion, preferably 50%, of the beam illumination is reflected through the waveplate 29 and the thin-film polarizer 37 to the optical detector 42 within the detector housing 40. The beam splitter 26 transmits the rest of the illumination to the reflective surface 17, (which has a 99.99% reflectance) through the waveplate 31 and the thin-film polarizer 37 to the optical detector 44.

The helicities of the beams R2, L3 are reversed to L2, R3 by the odd number of reflections. Thus, at the entrance to the quarter wave plates 29 and 31, the beams, in ascending frequency, are L1, L2, R3, R4. The frequencies L1 and L2 are of the same helicity, and they form a first gyro. The frequencies R3 and R4 are of the other helicity, and they form a second gyro. When the multioscillator ring laser gyro is rotated about its sensing axis in a first direction, the frequency difference L1–L2 increases, and the frequency difference R3–R4 decreases. When the sense of the rotation is reversed, the frequency difference L1–L2 decreases, and the frequency difference R3–R4 increases.

The waveplates 29 and 31 selectively convert the highly elliptically polarized light beams shown in FIG. 6 into linearly polarized light beams. The L polarized light is polarized into linearly polarized light in the waveplate 29, and the R polarized light is polarized into linearly polarized light in the waveplate 31.

The linearly polarized L beams in waveplate 29 rejected by the thin film polarizer 37, and a portion of the R beams are delivered to the photosensor 42.

Similarly, the linearly polarized R beams in waveplate 31 are rejected by the thin film polarizer 37, and a portion of the L beams are delivered to the photosensor 44.

The angular velocity, then, is measured by the frequency differences $(f_1-f_2)-(f_3-f_4)$.

Figure 11:
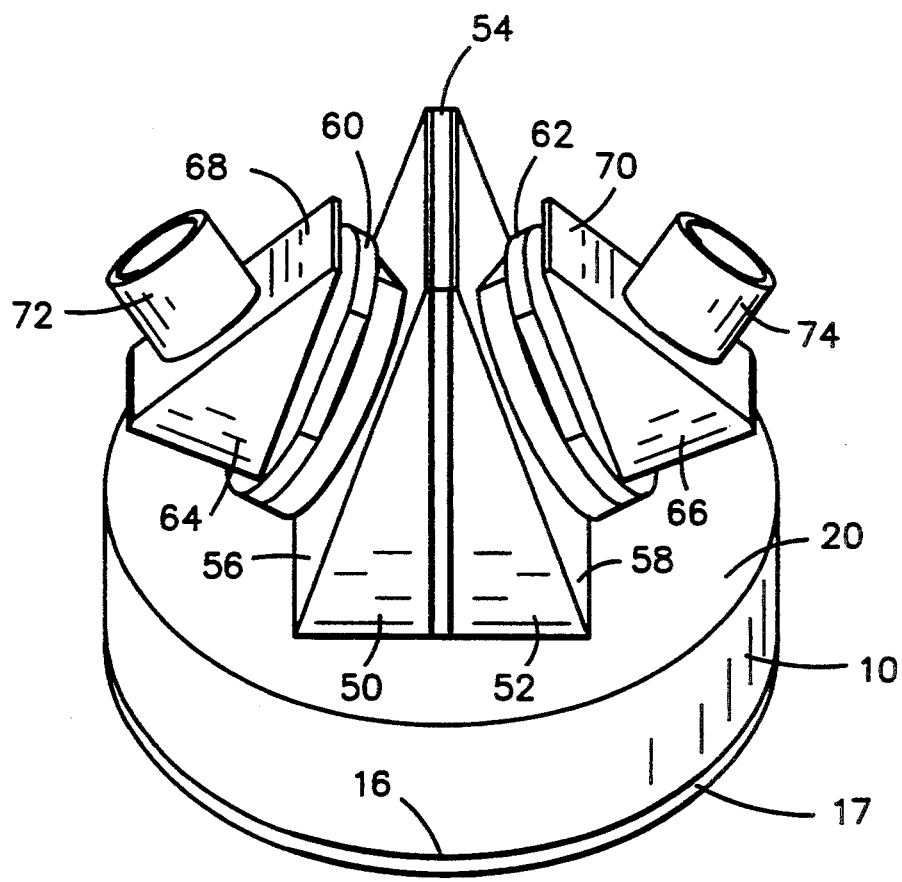
FIG. 11 is a view of a second embodiment of the apparatus of the invention.
Figure 12:
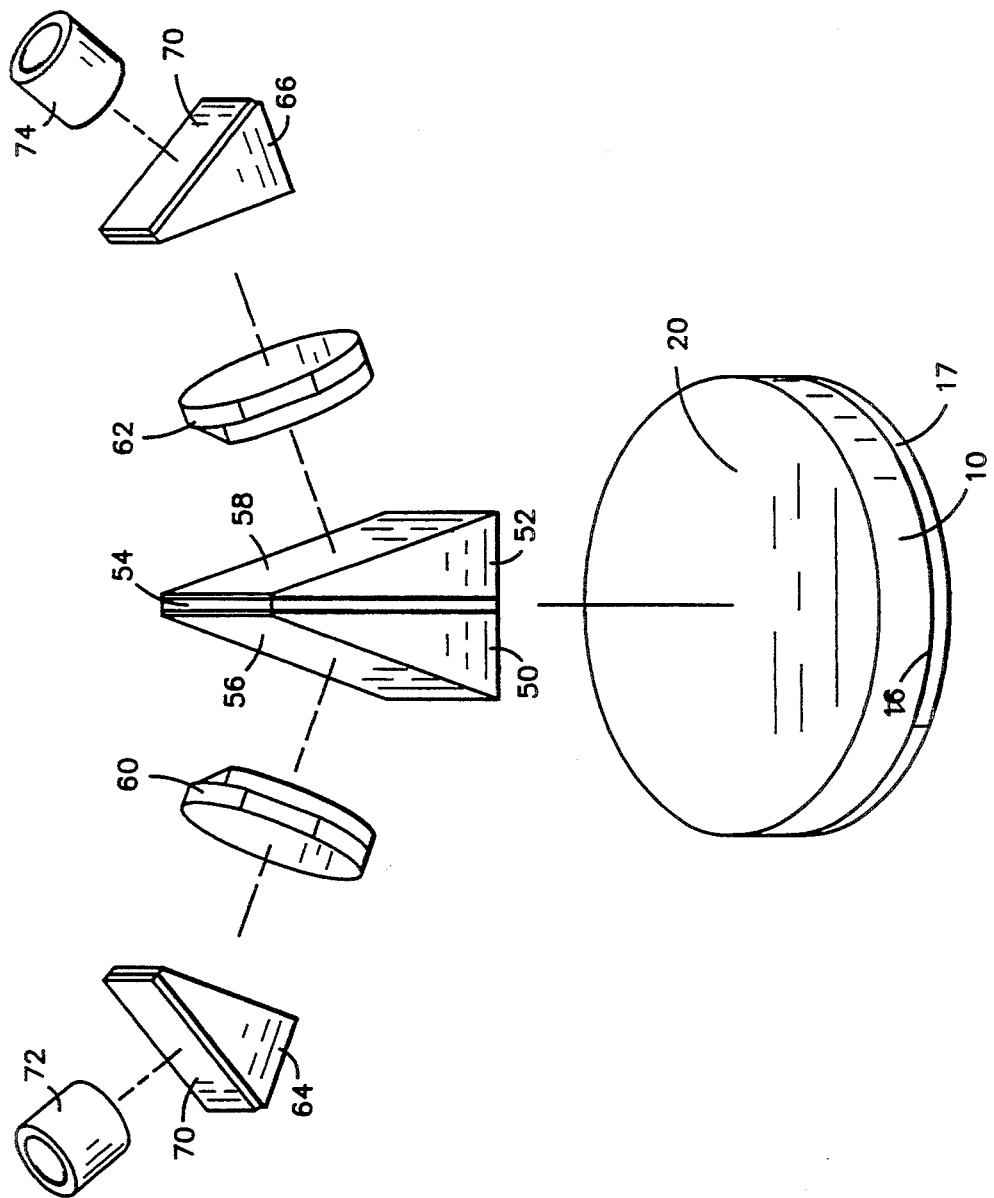
FIG. 12 is an exploded view of the apparatus of FIG. 11.
Figure 13:
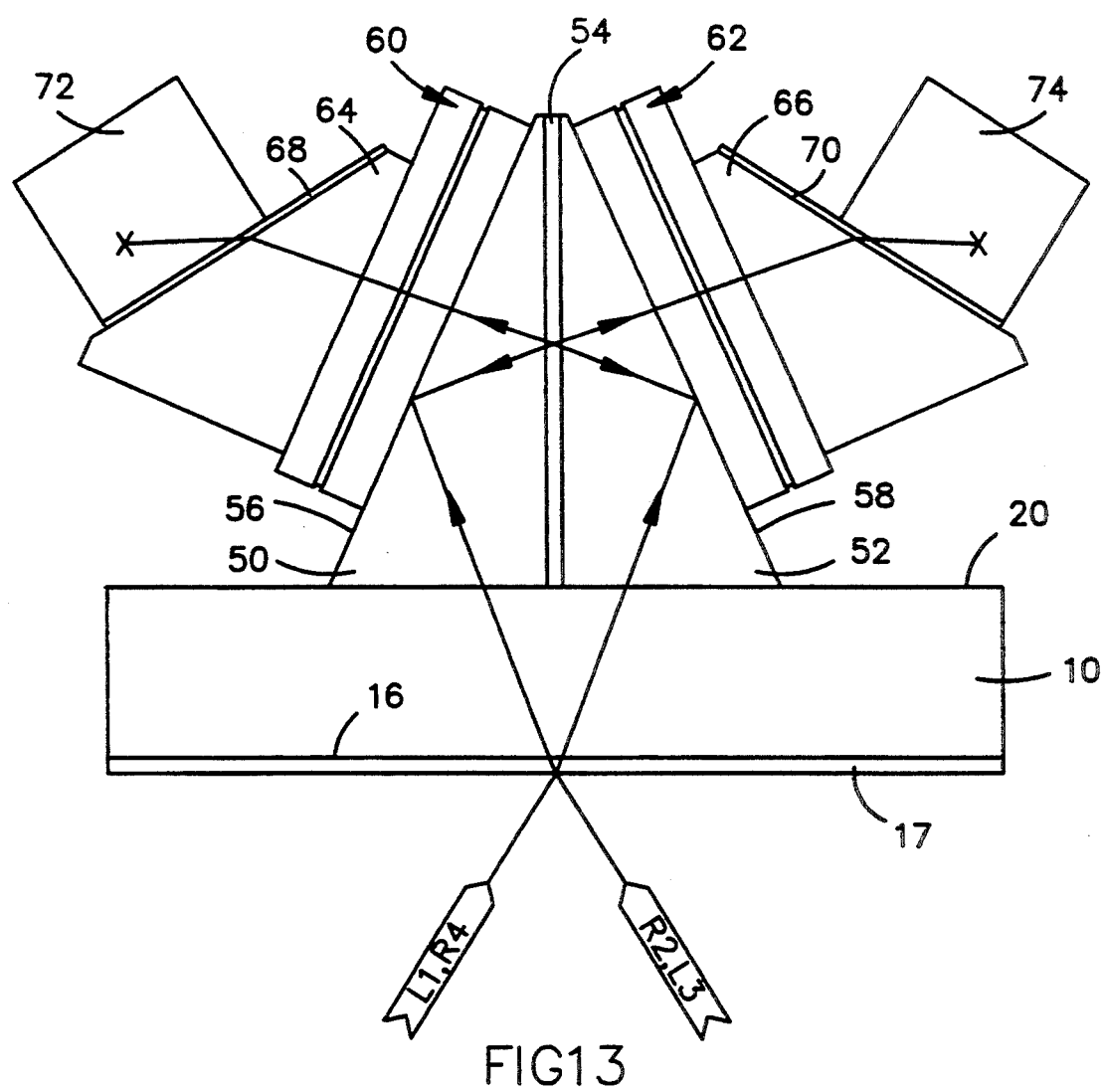
FIG. 13 is a ray diagram of the apparatus of FIGS. 11 and 12.

FIGS. 11–13 show a second, symmetrical embodiment of the invention.

Two identical prisms 50, 52, having a partly reflective and partly transmissive surface 54 positioned and attached between them, are, in turn, attached to the outside surface 20 of the laser mirror 10. Preferably the transmission and reflection intensities for the surface 54 are equal. In practice, because of the different polarizations of the beams, they will not be equal. The outer surfaces 56, 58 of the prisms 50, 52 support waveplates 60, 62, respectively. Prisms 64, 66 are attached to the waveplates 60, 62. The prisms 64, 66 have a thin polarizing film on their outer surfaces 68, 70. The detectors 72, 74 are exterior to the polarizing films on the surfaces 68 and 70.

Beams L1, R4 strike a reflective coating (not shown) on the surface 58, and they are reflected toward the surface 54. Part of the beam energy is transmitted through the waveplate 60 and the polarizing film 68 into the detector 72. The rest of the beam energy is reflected at the surface 54 into the waveplate 66 and the polarizing film 70 into the detector 72.

In the same manner, the beams R3, L3 are reflected from the surface 56 into the surface 54. Part of the beam energy is transmitted through waveplate 62 and polarizing film 70 into the detector 74. The remainder of the beam energy is reflected from the surface 54 into the waveplate 60 and the polarizing film 68 into the beam detector 72.

The beams transmitted through the surface 54 have reversed their polarization because of the reflections from surfaces 56 and 58. The beams reflected from surface 54 do not have a reversed polarization. Thus, the waveplates 60 and 62 receive beams L1, L2, R3, R4. The waveplates may be set to pass only the right or only the left helicity beams to their respective detectors.

Either the L or the R beams are linearly polarized by the waveplate 62, and the L or R beams are linearly polarized by the waveplate 60. The linearly polarized beams are blocked by the polarizing films 68 and 70. It is seen that the linearly polarized beam must be either the R or L beams in both waveplates.

The angular velocity, then, is measured by the frequency differences $(f_1-f_2)-(f_3-f_4)$.

Thus, the apparatus of this invention is a reliable, reproducible, efficient optical system for use in a ring laser multioscillator.

Although the invention has been described in detail above, it is not intended that the invention shall be limited by that description, but only according to the description taken together with the accompanying claims.

I claim:

1. In combination:
   A DILAG multioscillator ring-laser gyro, including at least four non-coplanar laser intersecting branches forming a closed loop having a sensing axis enclosed therein, with a corner mirror at each intersection of said branches, at least one of said corner mirrors being partly transmissive, and having counterpropagating elliptically polarized beams propagating around said loop;
   an optical prism structure, including partly transmissive mirrors, attached to each of said transmissive corner mirrors, said prism structure being configured and positioned to reflect laser beams that traverse said ring laser in a first direction without a change of helicity, and to reflect laser beams that traverse said ring laser in a second direction with a reversal of helicity;
   a waveplate and a polarizing thin film, positioned in the path of each beam, said waveplate having a thickness, dependent upon the ratio of the intensities of the two differently s and p polarized beams, to produce a phase shift in one elliptically polarized beam to convert it into a linearly polarized beam that is blocked by said thin film; and
   light sensor means intercepting beams leaving said waveplate and film.

2. Apparatus as recited in claim 1 in which the principal axes of each said waveplate are turned relative to the axes of polarization of said film.

3. Apparatus as recited in claim 2 wherein said waveplate is oriented with its principal crystal axes substantially forty five degrees from the s and p axes of polarization.

4. Apparatus as recited in claim 2, having two waveplates and polarizing tilted thin films, in which the thickness of said first waveplate produces phase shift in said beams propagating in a first direction around said loop to cause them to become linearly polarized, and the thickness of said second waveplate produces phase shift in said beams propagating in a second direction around said loop to cause them to become linearly polarized, said tilted thin film polarizers blocking linearly polarized beams, and said unblocked beams are delivered to said light sensors.

5. Apparatus as recited in claim 4 wherein the thickness of each waveplate is $2\phi$, where $\phi$ equals the arctangent of the ratio of the intensities of the two components of polarization in the s and p directions.

6. Apparatus as recited in claim 5 wherein $\phi$ equals the arctangent of the ratio of the intensity of the p component to the intensity of the s component.

7. Apparatus as recited in claim 3 wherein the thickness of each waveplate is such that the phase shift of each said waveplate is $2\phi$, where $\phi$ equals the arctangent of the ratio of the intensities of the two components of polarization in the s and p directions.

8. Apparatus as recited in claim 7 wherein $\phi$ equals the arctangent of the ratio of the intensity of the p component to the intensity of the s component.

9. Apparatus as recited in claim 2 wherein the thickness of each waveplate is such that the phase shift of each said waveplate is $2\phi$, where $\phi$ equals the arctangent of the ratio of the intensities of the two components of polarization in the s and p directions.

10. Apparatus as recited in claim 9 wherein $\phi$ equals the arctangent of the ratio of the intensity of the p component to the intensity of the s component.

11. Apparatus as recited in claim 1 wherein the thickness of each waveplate is such that the phase shift of each said waveplate is $2\phi$, where $\phi$ equals the arctangent of the ratio of the intensities of the two components of polarization in the s and p directions.

12. Apparatus as recited in claim 11 wherein $\phi$ equals the arctangent of the ratio of the intensity of the p component to the intensity of the s component.

* * * * *